July 1, 1969 L. J. McKESSON 3,453,622

POLARIZATION DIVERSITY TRANSMISSION SYSTEM

Filed June 15, 1967

INVENTOR.

LEWIS J. Mc KESSON

BY

ATTORNEY

United States Patent Office 3,453,622

Patented July 1, 1969

3,453,622

POLARIZATION DIVERSITY TRANSMISSION SYSTEM

Lewis J. McKesson, Nashua, N.H., assignor to Sanders Associates, Inc., Nashua, N.H., a corporation of Delaware Filed June 15, 1967, Ser. No. 646,358
Int. Cl. H04b 7/10
U.S. Cl. 343—100 6 Claims

ABSTRACT OF THE DISCLOSURE

A wireless receiver minimizes the effect of the polarization rotation of incoming radio signals by employing a pair of differently polarized antennas having a common phase center and essentially identical directivity patterns, except for polarization direction. Rotation of the plane of polarization of the incoming wave alternately induces a maximum signal in one antenna and then the other. The receiver combines the two signals by selecting the better of them or providing a weighted sum thereof, thereby maximizing the signal-to-noise ratio and minimizing errors due to signal fading.

BACKGROUND OF THE INVENTION

*Field of the invention*

Figure 1:
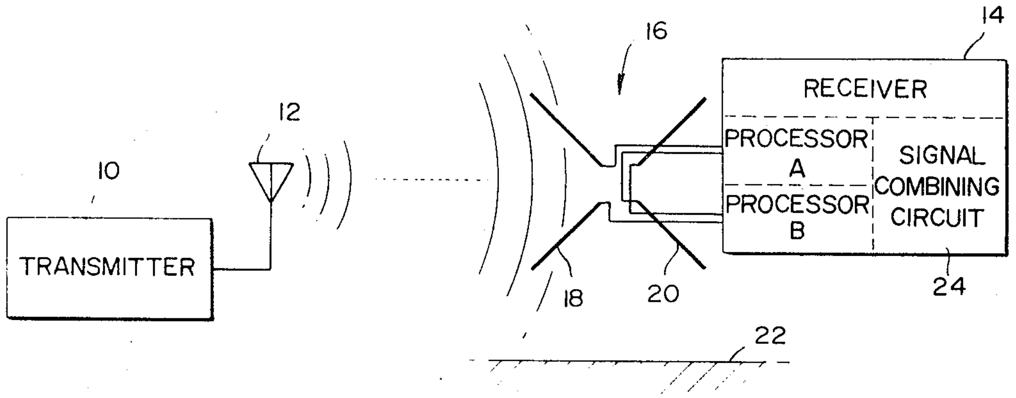

This invention relates to the reception of wireless signals subject to polarization angle rotation in passing through the troposphere and ionosphere. More specifically, it relates to a receiving system incorporating two or more antennas with different polarizations to provide superior incoming signals to two or more receivers. The receivers in turn process the antenna signals to minimize the overall fading thereof.

*Prior art*

Wireless signals transmitted over the horizon by means of ionospheric and tropospheric refraction are subject to distortion caused by multiple path propagation. Distortion is also caused by changes of the polarization angle. These two effects result in a variable amplitude and phase of the incoming signal at the receiving antenna.

A number of schemes have been employed to improve reception, generally by making use of the fact that the instantaneous character of the signal varies with the physical location of the receiving antenna. Thus, two or more receiving antennas are sometimes spaced apart by considerable distances in an arrangement known as space diversity. The improvement obtained with such a system results from the fact that the signal at each receiving antenna varies substantially independently of the signals at the other receiving antennas; thus, the times that they are all unsatisfactory occur less often, as compared with the rate at which this occurs with a single antenna and receiver. Several methods are used to select the best signal from the different antennas or to combine them in a weighted sum arrangement according to their amplitudes. In any case, this results in an output signal having a lower error rate than any of the individual signals from the respective antennas.

While the various diversity arrangements produce signals with much lower error rates, there is always a finite probability that the signals from all of the antennas will be unsatisfactory at the same time, either alone or in combination. It often happens that this occurs frequently enough to affect significantly the quality of a transmission.

Moreover, the increase in reliability provided by diversity systems is gained at the expense of higher cost and a substantial space requirement, particularly if one is to obtain the full benefits of space diversity.

OBJECTS OF THE INVENTION

Accordingly, a principal object of the invention is to provide a wireless communication antenna system having an improved anti-fade capability. A more specific object is the provision of a system of this type adapted for the reception of signals transmitted between two points on the earth by ionospheric and tropospheric refraction and reflection.

A further object of the invention is to provide a system of the foregoing type requiring less ground area than prior systems having anti-fade capabilities, particularly those making use of space diversity.

Another object of the invention is to provide a system of the foregoing type capable of using conventional wireless receivers.

Yet another object of the invention is to provide a wireless communication system employing techniques easily implemented with existing apparatus without undue modification costs.

Another object of the invention is to provide a receiving system for use in a communication system having the foregoing characteristics.

A further object of the invention is to provide an antenna construction for a system of the above type.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

BRIEF DESCRIPTION OF THE INVENTION

In brief, the invention makes use of a plurality of antennas having a common phase center and polarized at an angle with each other. Preferably, the system employs a pair of antennas having mutually orthogonal polarization planes and the specific description following below is directed to such an arrangement. The fading of signals received by two such antennas is largely anti-correlated, that is, when one signal decreases in strength due to fading, the signal from the other antenna generally undergoes a corresponding increase. Therefore, a receiver employing a conventional antenna selection circuit to select the antenna with the strongest signal or the best signal-to-noise ratio signal will provide an output largely free of destructive fading. Preferably, the mutually orthogonal antennas are polarized at an angle of $\pm 45°$ with respect to ground so as to take advantage of the effect of ground reflections.

The invention is largely based on the previously known fact that the fading of a signal transmitted over the horizon is largely due to varying rotation of the plane of polarization by the varying medium through which the signal passes. The fact that the polarization angle is changed is no problem in itself, since the polarization plane of a receiving antenna can be oriented to coincide with that of the incoming signal and thereby maximize sensitivity to the signal. However, with the amount of rotation by the medium varying in a random manner, the polarization angle of the signal at the receiving antenna undergoes a corresponding random variation; at times it may be substantially orthogonal to the polarization plane of the antenna, thereby subjecting the signal to a deep fade. Previous efforts to make use of the knowledge of this phenomenon have been largely ineffective because of the inability to provide proper antennas.

Moreover, the interference pattern resulting from ground reflections of the incoming signal is a function of polarization, and this further varies the strengths of signals received by conventional vertically or horizontally polarized antennas.

On the other hand, if the system makes use of a pair of orthogonally polarized receiving antennas having a substantially common phase center, variation of signal polarization will increase the signal strength in one antenna at the same time that it decreases in the other. For example, whenever the polarization of the signal is orthogonal to that of one antenna, corresponding to minimum received signal strength, it is parallel to that of the other antenna, so that the strength of the receiving signal in the latter antenna is at a maximum. The signal strengths of the two antennas are equal when the polarization plane of the incoming signal is halfway between the polarization planes of the antennas, i.e. 45° with respect to each of the antenna polarization planes. With this latter polarization of the signal, the signal power output in each of the antennas is one-half the maximum. Therefore, by using a receiver which automatically switches to the antenna having the greater signal strength, fading due to polarization rotation will reduce the received signal strength by approximately 3 db as contrasted with the deep fades of up to 40 db or more encountered with prior systems.

With the two antennas erected in a common volume, the space requirement for the system is substantially less than in prior space diversity systems. The required land area can be substantially less than one-half, depending on the spacing of the antennas used for space diversity.

The invention should not be confused with previous diversity systems employing polarization diversity. In an arrangement of this type, a pair or group of antennas are widely spaced apart to make use of the fact that the correlation between the polarizations of a received signal at different points is inversely related to the distance between the two points. With the present invention, on the other hand, the antennas have the same phase center, that is, they are located at essentially the same point in space for incoming signals. Thus, the signal polarization is orthogonal for each antenna.

Nor should the system be confused with prior antenna systems in which orthogonally polarized antennas are interconnected to directly sum their R.F. signal outputs prior to detection. For the purposes of the present invention, the composite output of such antennas, usually the sum and difference, provides no usable improvement in performance on any output port over that when they are not interconnected, at least in the arrangements previously suggested. In fact, since such interconnecting devices have losses and only approximate the desired phase and amplitude values, especially over wide frequency values, their use is, in general, unsatisfactory for optimum performance.

Another point to be kept in mind is the fact that the antenna system has substantial directive gain, whereas in some arrangements for interconnecting antennas most of the directive gain of the individual antennas is lost over at least part of the frequency range.

While any orthogonal arrangement of the antennas will provide benefits, it has been found preferable to orient the antennas with their polarization planes at ±45° with respect to ground. This arrangement provides identical azimuthal and elevation patterns, which is necessary for optimum performance of diversity systems. If two antennas are erected, one horizontally polarized and one vertically polarized, both the azimuthal and elevation patterns will be considerably different as a consequence of the difference in the reflecting characteristics of the ground (or other reflecting medium) for horizontally and vertically polarized signals. In the elevation pattern, the vertically polarized antenna will generally have good sensitivity at low angles and the horizontally polarized unit will generally have relatively inferior sensitivity. Because of this, the vertically polarized antenna will deliver a superior signal for low-angle arriving waves and the horizontal unit will be useful only a small percentage of the time, when multiple path propagation is experienced. The result may be to vitiate the advantages of the invention to some extent if the antennas are horizontally and vertically polarized.

Figure 2:
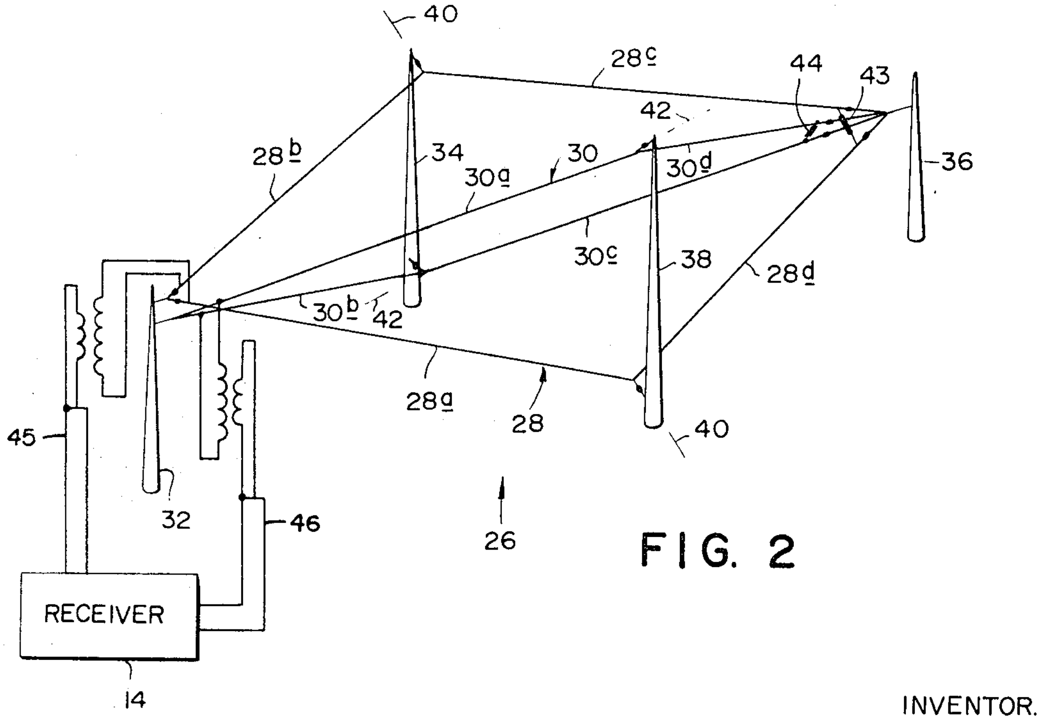

For a fuller understanding of the nature and objects of the invention, reference should be had to the following detailed description taken in connection with the accompanying drawings, in which:

FIG. 1 is a schematic representation of a communication system embodying the invention; and FIG. 2 illustrates a receiving system embodying the invention and employing an ortho-rhombic antenna shown in perspective.

As shown in FIG. 1, a communication system employing the invention may include a conventional transmitter 10 connected to a transmitting antenna unit 12. The antenna unit 12 may include one or more antennas constructed and arranged in accordance with conventional practice. It also may be one-half of an orthogonal-type antenna described herein.

At the receiving end of the system a diversity receiver 14 is connected to a receiving antenna unit 16 comprising a pair of antennas 18 and 20. Antennas 18 and 20, which are shown as dipoles, have a common phase center and mutually orthogonal polarizations. Furthermore, they are both oriented at an angle of ±45° with respect to the earth's surface, shown at 22.

The receiver 14 includes processors A and B connected to the antennas 18 and 20, respectively. The processors amplify the received signals and they may also include frequency conversion circuits and detectors. The outputs of the processors are fed to a signal combining circuit 24 which combines them according to any of the techniques presently used in combining signals from different antennas, or such other technique as may be deemed expedient. I prefer to use a combining circuit containing a simple switching arrangement that connects the combining circuit exclusively to the signal processor receiving the strongest antenna signal or the signal with maximum signal-to-noise ratio. In that case the combining circuit will be switched back and forth between the processors A and B as the relative signal quality from the two antennas vary under the fading conditions encountered by the system. Some hysteresis will ordinarily be incorporated into the switching arrangement to prevent signal degradation from jitter when the signal strengths of the two antennas are close to the same value.

A number of other arrangements are available for combining two or more signals to improve the quality of the output signal. These various combining techniques are well known and need not be described in detail here. Moreover, since they are already used in anti-fade systems, it will be apparent that presently existing receivers can be employed without modification to obtain the benefits of the present invention. Only the antenna unit need be different, as described above, and the use of an antenna unit embodying the invention results in a substantial cost and land area saving, as will be apparent from the antenna system specifically described below.

More specifically, as shown in FIG. 2, an antenna unit 26 comprises a pair of rhombic antennas 28 and 30 suspended from the same set of masts 32, 34, 36 and 38. The conductors **28*a*–28*d* of the antenna 28 lie in a plane which, along with the transverse axis 40 of this antenna, is oriented at an angle of 45° with respect to ground or such other reflecting medium as may be present. Thus the polarization of the antenna 28, which has the same orientation as the axis 40**, is at a 45° angle.

In like manner, the conductors **30*a*–30*d* of the antenna 30, along with the transverse axis 42 of this antenna, form a 45° angle with ground, but with the opposite inclination from that of the axis 40 of the antenna 28. Thus the polarization of the antenna 30 has a 45° inclination and is also orthogonal (90°) to that of the antenna 28**. It will be apparent that with the two antennas being congruent and suspended from the same set of masts, they have a common phase center. Therefore, they fully meet the criteria set forth above for optimum operation in accordance with the present invention.

Each antenna is terminated in a resistor (43, 44) corresponding to the characteristic impedance of the antenna.

The two antennas of FIG. 2 occupy essentially the same ground areas as a single horizontal antenna. Moreover, only a single set of masts is required instead of two sets or more, which are needed in space diversity systems.

The only additional cost for the antenna unit 26, as compared with the cost of the supports for a single rhombic antenna, is due to the somewhat greater height of the masts 34 and 38 occasioned by the sideways tilting of the antenna.

The illustration shows the boresight axis of the antenna parallel to the ground. This axis may be tilted up or down, as is usual in horizontally polarized rhombic antennas. However, tests indicate that for usual dimensions and frequencies, this type of tilt is not necessary because of the superior shape of the elevation pattern over the angles desired. It should be noted that when the boresight axis is tilted, the polarization planes of the antennas cannot be both mutually orthogonal and 45° with respect to ground. In that case it is generally preferable that they retain the orthogonal relationship and make equal angles with respect to ground. Even with the tilting, the latter angles will ordinarily not be so different from 45° as to lose all the advantages of this preferred orientation.

The following is a more specific example of an antenna system of the type shown in FIG. 2, designed for operation in the range around 12MHz.

| | |
|---|---|
| Length of each of the conductors **28***a*–**28***d* and **30***a*–**30***d* ----feet-- | 600 |
| Apex angle (between conductors **28***a* and **28***b* and between conductors **30***a* and **30***b*) ----degrees-- | 30 |
| Height of the feed and terminal points at the masts **32** and **36** ----feet-- | 147 |
| Height of junction of conductors **28***b* and **28***c* at mast **34** and conductors **30***a* and **30***d* at mast **38** ----feet-- | 244 |

It should be understood that while each of the rhombic antennas 28 and 30 is illustrated using single conductors as radiating elements, multiple wires, usually two or three, may be used. This provides a more uniform impedance match at the transmission lines 45 and 46.

Ordinarily, two or more antennas in any system can be constructed with exactly the same phase center, as illustrated with the dipoles of FIG. 1 and the rhombic antennas of FIG. 2. Other examples include dipole arrays, log periodic and "fishbone" antennas. In any case, there can be some separation of the phase centers without losing the benefit of the invention. Generally, a separation up to about ⅛ wavelength can be tolerated, although with some reduction in effectiveness. With greater separation there is a corresponding reduction in the desired anti-correlation effect and, in fact, diversity systems, which require a substantial reduction in correlation, are in some cases operative with separations of as little as a wavelength.

While the system described above employs a single pair of antennas, it will be apparent that three or more antennas having a common phase center and different polarization angles can be employed, with the receiver combining the signals from the individual antennas in the manner described. Generally, however, a two-antenna system is to be preferred, since the addition of more antennas will not, in most cases, enhance operation sufficiently to justify the additional cost. In this connection one should keep in mind the fact that when three or more antennas are used, they cannot all have the preferable 45° polarization angle with respect to ground.

Where other fading effects or interference problems are encountered, making it desirable to use diversity techniques, one may employ two or more antenna units embodying the invention, with the outputs of the antennas themselves or of receivers connected to the respective antenna units then being combined to provide the advantages of diversity. Also, it should be noted the while the antennas in each illustrated unit have completely separate elements, it may in some cases be possible to have one or more elements common to both antennas. Therefore, a pair of orthogonally polarized antennas, as the term is used herein, includes any arrangement by which one may obtain two outputs whose relative responses to signals having varying polarizations are similar to the relative outputs of a pair of orthognally polarized antennas having completely separate elements.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A communication system comprising (A) a transmitting system arranged to transmit wireless signals subject to varying rotation of polarization by the medium through which they propagate, (B) a receiving system for receiving said signals, said receiving system including (1) a pair of antennas (a) having mutually orthogonal polarizations, (b) so located with respect to a reflecting medium that they receive a substantial portion of said signals by way of reflection from said reflecting medium, and (c) polarized substantially at 45° with respect to said reflecting medium, and (2) signal combining means for combining the outputs of said antennas to reduce the variations in signal strength from antennas due to rotation of the plane of polarization of said signals at said antennas.

2. The system defined in claim 1 in which said antennas are rhombic antennas.

3. A receiving system for the reception of wireless signals subject to varying rotation of their polarization by the medium through which they propagate, said system comprising (A) a pair of antennas for intercepting said signals, said antennas (1) having mutually orthogonal polarizations, (2) being so located with respect to a reflecting medium that they receive a substantial portion of said signals by way of reflection from said reflecting medium, and (3) being polarized at substantially 45° with respect to said reflecting medium, and (B) signal combining means for combining the signals from said antennas to reduce the effect of variation of signal strength from each antenna due to rotation of the polarization of said signals at said antennas.

4. The combination defined in claim 3

(A) including means for separately detecting the signals from said antennas, and (B) in which said signal combining means combines the outputs of said detectors.

5. The system defined in claim 3 in which said antennas have a substantially common phase center.

6. An antenna unit for the interception of signals subject to varying polarizations at said system, said unit comprising (A) first and second antennas
  (1) having substantially orthogonal polarizations,
  (2) having a substantially common phase center,
  (3) being sufficiently close to ground to receive by way of reflection therefrom substantial portions of the signals they intercept, and
  (4) having polarizations oriented substantially 45° with respect to ground, and (B) means for extracting separately the signals intercepted by said antennas.

References Cited

UNITED STATES PATENTS

| | | | |
|---|---|---|---|
| 2,208,810 | 7/1940 | Katzin | 343—733 |
| 2,379,706 | 7/1945 | Hansell | 343—733 |
| 2,700,733 | 1/1955 | Brueckmann | 343—737 X |
| 3,137,853 | 6/1964 | Cutler | 343—100 |

RICHARD A. FARLEY, *Primary Examiner.*

T. H. TUBBESING, *Assistant Examiner.*

U.S. Cl. X.R.

343—733, 737